United States Patent

[11] 3,604,793

| [72] | Inventors | Elmer O. Wangerin;<br>Donald P. Welty, both of Rochester, N.Y. |
|---|---|---|
| [21] | Appl. No. | 821,563 |
| [22] | Filed | May 5, 1969 |
| [45] | Patented | Sept. 14, 1971 |
| [73] | Assignee | Eastman Kodak Company<br>Rochester, N.Y. |

[54] CONTROL FOR STRIP-DRIVING APPARATUS
13 Claims, 8 Drawing Figs.

[52] U.S. Cl. ...................................................... 353/23,
352/229,
[51] Int. Cl. ...................................................... G03b 1/42,
G03b/1/50 G03b 1/48
[50] Field of Search ........................................... 318/331;
353/23; 352/229; 192/.03; 340/309.1, 309.4

[56] References Cited
UNITED STATES PATENTS

| 2,610,540 | 9/1952 | Beitz ............................. | 353/23 |
| 2,659,267 | 11/1953 | Baule ............................ | 353/23 |
| 3,264,544 | 8/1966 | Bowers ......................... | 318/331 |

*Primary Examiner*—Leonard Forman
*Assistant Examiner*—Paul G. Foldes
*Attorneys*—Robert W. Hampton and R. Lewis Gable ABSTRACT: A control circuit for a strip-driving apparatus wherein a strip of a material such as photographic film is driven from a supply reel to a takeup reel between a pair of transparent flats. The control circuit serves to regulate the speed and direction of a motor connected to the takeup and supply reels, to open the transparent flats to allow the strip to be driven therebetween without scratching the strip and also to provide a delay dependent upon the time for which the strip is driven, before the glass flats are closed.

PATENTED SEP 14 1971
3,604,793
SHEET 1 OF 3
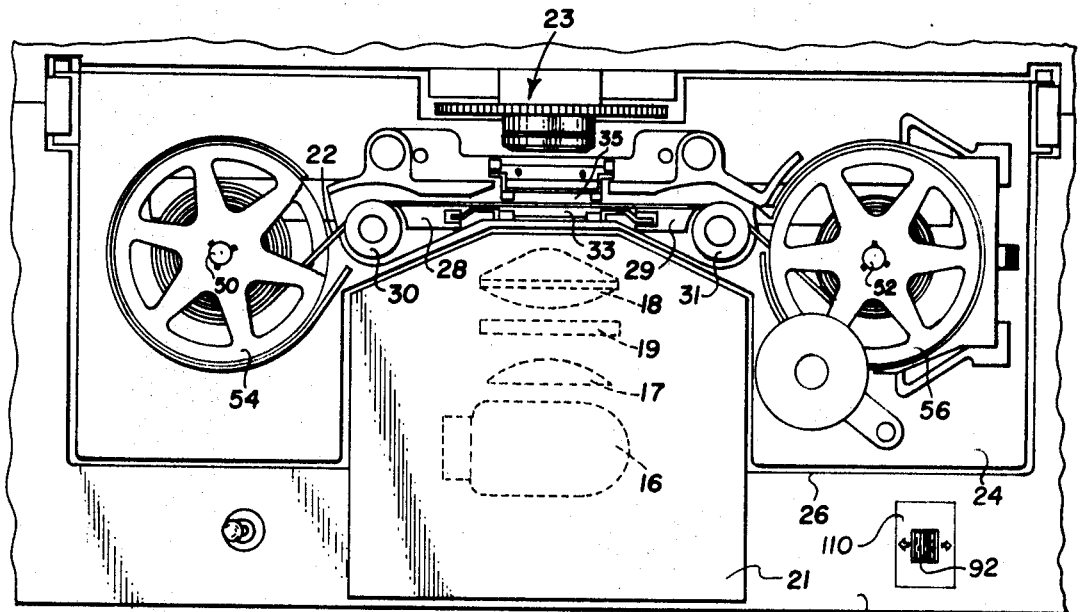
FIG. 2
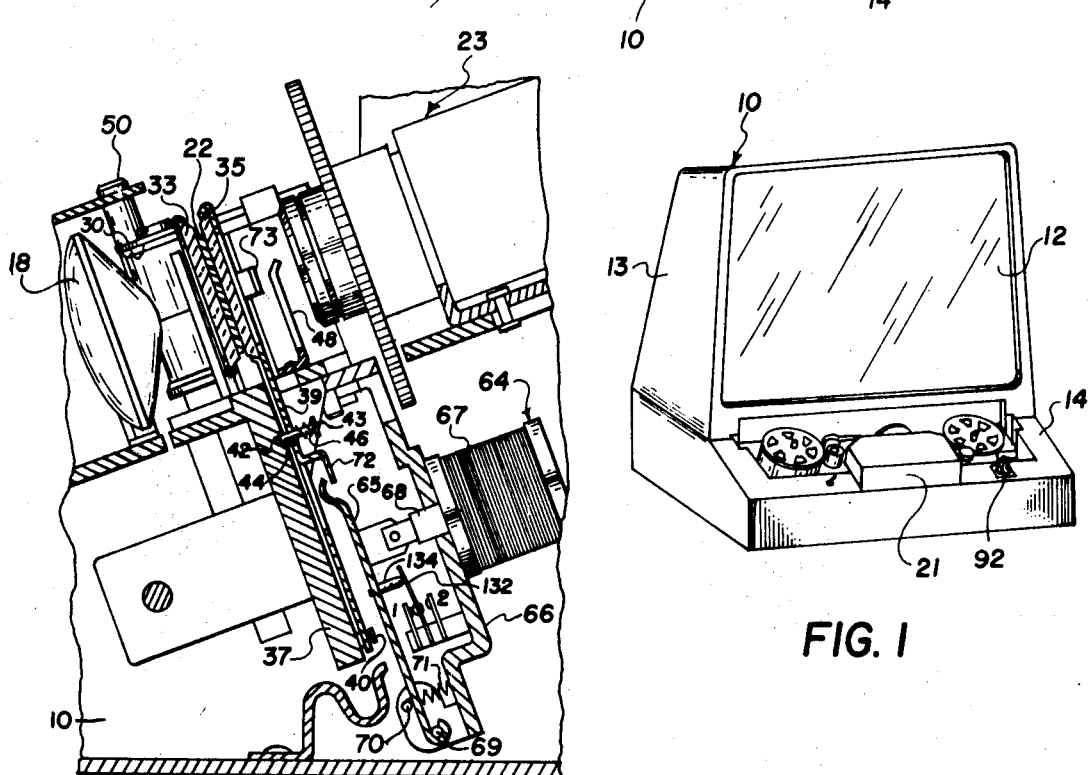
FIG. 3
FIG. 1
ELMER O. WANGERIN
DONALD P. WELTY
INVENTORS
BY R. Lewis Gable
Robert W. Hampton
ATTORNEYS

PATENTED SEP 14 1971

ELMER O. WANGERIN
DONALD P. WELTY
INVENTORS

BY *R. Lewis Gable*

*Robert W. Hampton*

ATTORNEYS

ELMER O. WANGERIN
DONALD P. WELTY
INVENTORS

BY R. Lewis Dable
Robert W. Hampton
ATTORNEYS

CONTROL FOR STRIP-DRIVING APPARATUS

CROSS-REFERENCE TO RELATED APPLICATIONS

Reference is made to commonly assigned copending U.S. Pat. application Ser. No. 730,223 entitled "Convertible Record Viewer or the Like," filed in the name of Elmer O. Wangerin, and to commonly assigned copending U.S. Pat. application Ser. No. 730,450 entitled "Reel Spindle Drive Means for Folm Reader or the Like," filed in the name of Elmer O. Wangerin.

BACKGROUND OF THE INVENTION

1. Field of the Invention

This invention relates to filmstrip readers or viewers and more specifically, to control circuits for regulating the speed and direction in which the filmstrip is driven and also for regulating the opening and closing of a pair of transparent flats through which the filmstrip is driven.

2. Description of the Prior Art

Filmstrip, commonly known as microfilm, is typically used to store great quantities of information to be read out or viewed upon suitable viewers or readers. Typically, an extended length of microfilm with a great number of document images thereon is stored upon a reel. Such a reel of microfilm would be inserted into a viewer wherein the leading end of the microfilm would be connected to a takeup spool. The microfilm may be unwound from the reel and wound onto the takeup spool until the document image of interest is found. Typically, the microfilm is unwould from the supply reel to the takeup reel at a relatively slow speed stopping frequently to search for the selected image. When the selected image is found, it may be projected onto a display screen so that the operator may examine the selected image at length.

To obtain good image quality in film readers, it is necessary that the microfilm or filmstrip be accurately maintained in the focal plane of the projection system. Typically, this may be accomplished by clamping the filmstrip between a pair of transparent flats. Illustratively, one of the pair of transparent flats is maintained stationary to thereby define accurately the focal plane of the projection system, while the other transparent flat may be readily moved from the stationary transparent flat. It will be readily understood that the transparent flat must be unclamped and separated so that the filmstrip may be driven therebetween without damaging the surface of the filmstrip. The surfaces of most filmstrips would be easily damaged and/or scratched if the filmstrip was driven against the surface of the transparent flats. While the transparent flats are unclamped, the filmstrip is not accurately disposed in the focal plane; however, it is not normally necessary to project and focus precisely the images from the strip while the strip is moving. Conversely, as soon as a filmstrip has been stopped for viewing, it is desirable again to dispose the filmstrip accurately in the focal plane by clamping the transparent flats together.

When a filmstrip has been driven at a high rate of speed by an electric motor, a period of time is required before the motor and the filmstrip may be brought to a complete halt. This is primarily due to to the inertia of the stip-driving mechanism and in particular, the electric motor. A solenoid may be used to open and close the transparent flats under the control of an electric switch. Such a switch may be used also to connect and disconnect a potential to the drive motor. When the switch is opened the solenoid will normally respond immediately, while the motor and strip-driving mechanism continues to move the filmstrip. If the flats are allowed to close before the filmstrip has been completely halted, the filmstrip may be torn or severely scratched.

In the prior art, various mechanical means have been used to provide a delay in the closing of the transparent flats after the potential has been removed from the drive motor. For example, a single switch or control mechanism may be employed to sequentially remove potential from first the drive motor and then from a solenoid, which responds by closing the transparent flats. Further, the solenoid may be provided with a bleeder valve which allows a delay, before a spring may act to close the flats. However, such devices provide only substantially fixed delays before the transparent flats may be closed. As a result, an operator who is searching for a particular frame or image upon an extended length of microfilm will be inconvenienced if he desires to search the microfilm at a slow speed and/or to view many images at a rather rapid pace. A fixed delay dependent upon the period required to stop a filmstrip driven at a high speed would provide unnecessary time delays when the filmstrip is being scanned or driven at slower speeds.

Therefore, it is a primary object of this invention to provide control means capable of driving a microfilm strip at varying speeds in either a forward or reverse direction and yet allow the closing of the transparent flats after a delay dependent upon the length of time the filmstrip has been driven.

SUMMARY OF THE INVENTION

In accordance with this and other objects, this invention provides a control apparatus or circuit for regulating the feeding of a filmstrip between a takeup reel and a supply reel by a suitable electrical motor. More specifically, the filmstrip is driven between a pair of transparent flats which may be opened and closed by a suitable device such as a solenoid to respectively maintain the filmstrip accurately within the focal plane of a projection system and to allow the filmstrip to be rapidly driven between the transparent flats without damaging the filmstrip. In accordance with the teachings of this invention, the control circuit is provided to regulate the speed with and direction in which the filmstrip is driven by the motor and also to provide a delay in closing the transparent flats after potential has been removed from the motor. The delay corresponds to the length of time for which the filmstrip has been driven. Further, the control circuit provides for the sequential energization of the solenoid immediately before the energization of the motor and provides for a delayed closing of the transparent flats after the motor has been deenergized. In one illustrative embodiment, the control circuit includes an RC circuit timing which is charged to a potential dependent upon the length of time that the drive motor has been operated and which is discharged when the motor is deenergized at a rate to prevent the transparent flats from being closed until the filmstrip has bee brought to a complete halt.

The invention, and its objects and advantages, will become more apparent from the detailed description of the preferred embodiment presented below.

BRIEF DESCRIPTION OF THE DRAWING

In the detailed description of the preferred embodiment of the invention presented below, reference is made to the accompany drawings, in which:

FIG. 1 is a perspective front view of a projection reader or apparatus in which circuit apparatus in accordance with the teachings of the present invention may be incorporated;

FIG. 2 is a plane view of the film deck portion of the reader shown in FIG. 1;

FIG. 3 is an enlarged, cross-sectional view of the reader shown in FIGS 1 and 2;

DESCRIPTION OF THE PREFERRED EMBODIMENT

Figure 4A:
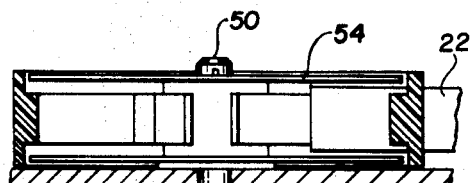
FIGS. 4A and 4B are cross-sectional views of a mechanism for driving the takeup and supply reels shown in FIGS. 1 and 2.

Referring now to the drawings and, in particular to FIG. 1, there is shown a projection reader or device 10 of the type wherein an image recorded upon a strip 22 of photographic film is projected onto the backside of a translucent screen 12 vertically mounted in a housing 13 behind and above a film deck 14. As depicted in greater detail in FIGS. 2 and 3, the film deck 14 supports an illumination system comprising in coaxial alignment a lamp 16, condenser lenses 17 and 18, and a filter member 19, such elements being enclosed by a removable cover 21. As will be described in greater detail later, an image frame, from a suitable information media such as the filmstrip 22, is to be displayed upon the screen 12. The filmstrip 22 is supported and aligned within the focal plane of the illumination system by a pair of transparent pressure plates 33 and 35. A lens assembly 23 is adjustably mounted ahead of the focal plane and in coaxial alignment with the illumination system. Behind the lens assembly 23, a slanted mirror, not shown, is located adjacent the rearward wall of the housing 13 and is adapted to reflect the projected image from the lens assembly 23 onto the back surface of the translucent screen 12. Accordingly, a greatly enlarged image of the selected image frame can be displayed by being focused and projected onto the back surface of the translucent screen 12.

A generally horizontal film deck plate 24 is located within an opening 26 in housing 13 below and in generally parallel relation to the axis of the optical system of the projection reader 10. As is explained in the above-identified copending application Ser. No. 730,223, the film deck plate 24 may be selectively adjusted with regard to the axis of the optical system of the projection reader 10 in order to accommodate information-bearing media of differing format. Further, the structure and operation of the projection reader 10 shown in FIGS. 1, 2 and 3 is more completely described in the copending application Ser. No. 730,223.

As shown in FIGS. 1 and 2, the projection reader 10 is adapted to rotatably mount a film supply reel 56 and a film takeup reel 54 respectively upon supply spindles 52 and 50. The filmstrip 22 wound upon the film supply reel 56 is directed between a transparent back pressure plate or flat 35 and a stationary front pressure plate or flat 33 to be wound on the takeup reel 54. More particularly, the filmstrip 22 is directed from the supply reel 56 over a guide roller 31, past a guide member 29, between the pressure plates 33 and 35, past a guide member 28, about a guide roller 30 and onto the takeup reel 54.

As clearly shown in FIG. 3, the back pressure plate 35 is mounted upon a frame member 39 for movement to and from the front pressure plate 33, which is stationarily mounted upon the projector reader 10. The frame member 39 is attached to a support member 37 at its lower end by rivet 40 extending through an oversized hole within the frame member 39 so that upper end of the frame member 39 can be rocked forwardly and rearwardly. Another rivet 42 extends through an oversize hole 44 in the frame member 39, with its head 43 spaced therefrom. A coil spring 46 is disposed in compression between the head 43 of the rivet 42 and the frame member 39 to resiliently urge the back pressure plate 35 toward the front pressure plate 33 so that the selected film frame of the filmstrip 22 may be disposed between the pressure plates 33 and 35 in a defined plane which substantially coincides with the focal plane of the illumination and projection systems. Behind the frame member 39, a pair of stop fingers 48 extend upwardly to intercept the movement of ears 73, thereby defining the maximum separation of the back pressure plate 35 from the front pressure plate 33.

As previously mentioned, the back and front pressure plates 33 and 35 should be separated whenever the filmstrip 22 is driven either in a forward or rewinding direction to thereby prevent the filmstrip 22 from being scratched or otherwise damaged. To separate the pressure plates 33 and 35, a solenoid 64 is mounted upon a support bracket 66 and is connected to the control circuit shown in Fig. 7 in a manner to be described so that a solenoid coil 67 is energized to retract an armature 68 of the solenoid 64. The armature 68 is connected to a lever 65 pivotally mounted about a pin 69. The lever 65 is biased by a coil spring 71 toward its closed position as shown in FIG. 3 in contact with a stop pin 70. Whenever the solenoid coil 67 is energized, the upper end of the lever 65 engages an ear 72 extending from the frame member 39 to pivot the frame member 39 rearwardly to a position in which ears 73 are in contact with stop fingers 48. As shown in FIG. 3, a snap-action switch 132 is mounted upon the support bracket 66 to be engaged by an actuating finger 134 mounted on and projecting from the lever 65. Thus, when the solenoid coil 67 is actuated to rotate the lever 65 in a clockwise direction as shown in FIG. 3, the actuating finger 134 will engage the snap-action switch 132 to throw it from its first position 132a to its second position 132b. When the solenoid coil 67 is deenergized, the spring 71 will return the lever 65 to the position shown in FIG. 3 and snap-action switch 132 will be again disposed in its first position.

Figure 4B:
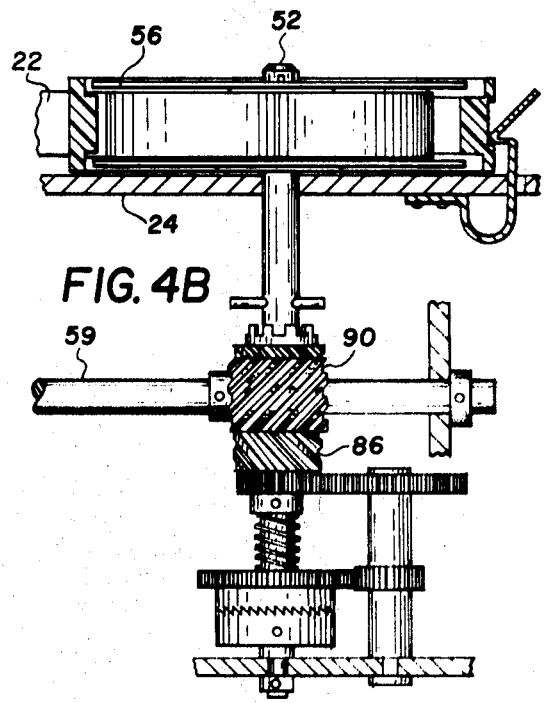

The strip 22 can be wound selectively in either direction to locate any desired portion of the strip 22 between the front and back pressure plates 33 and 35 by means of a switch assembly 60 which controls, as will be explained in detail later, the operation of a reversible motor 62 in either direction. A reel spindle drive mechanism for effecting such selective movement of the filmstrip 22 is disclosed in the above-identified, copending U.S. Pat. application, Ser. No. 730,450, and need not be explained in detail for purposes of the present disclosure. Briefly, with regards to FIGS. 4A and 4B, the reversible motor 62 mechanically drives in either direction a pulley 74, which in turn transmits a rotational torque to a pulley 78 by a belt 76 disposed therebetween. The pulley 78 is secured by a hub 80 to a drive shaft 59. In turn, a pair of helical driving gears 88 and 90 are fixably secured to the driving shaft 59 and meshed respectively with a pair of spindle gears 84 and 86. More specifically, the helical driving gears 88 and 90 respectively serve to rotate the spindle gears 84 and 86 which are respectively connected to take up and supply spindles 50 and 52 respectively. In operation, the reversible motor 62 rotates the spindles 50 and 52 in a first direction to wind the filmstrip 22 from the supply reel 56 to the takeup reel 54. The speed of the film movement is determined, as will be explained later, by the speed of the reversible motor 62. Conversely, when the reversible motor 62 is operated in the opposite, or second direction, the filmstrip 22 will be wound from the takeup reel 54 to the supply reel 56.

Figure 5:
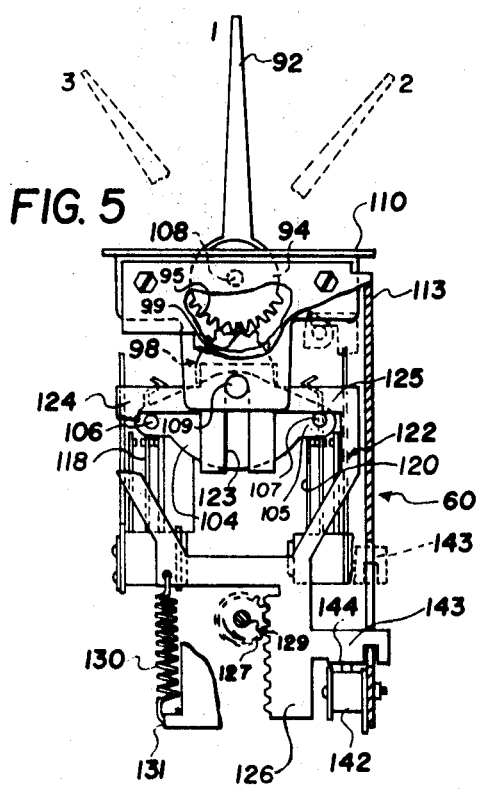
FIGS. 5 and 6 are respectively a side and a perspective view of a switch assembly for controlling the direction and speed with which the motor shown in FIG. 4A is driven.
Figure 6:
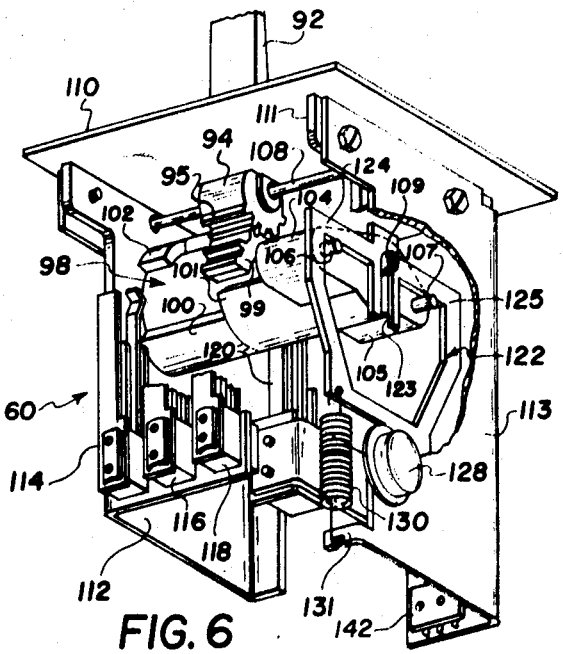

Referring now to FIGS. 5 and 6, there is shown the switch assembly 60 which serves, as will be explained in detail later, to control the various functions of the circuit shown in FIG. 7. The switch assembly 60 includes a switch lever 92 which may be disposed in either of three positions. When the lever 92 is disposed in its first position (identified by the number 1), the circuit of FIG. 7 will respond to stop the reversible motor 62 and to clamp the filmstrip 22 between the pressure plates 33 and 35. When the switch lever 92 is placed in its second position (identified by the number 2), the motor 62 will serve to rewind a filmstrip 22 onto the supply reel 56, and when the switch lever 92 is disposed in its third position (identified by the number 3), the reversible motor 62 will operate to unwind the filmstrip 22 onto the takeup reel 54. The switch lever 92 is rotatably mounted upon a shaft 108, which is in turn suspended between support members 111 and 112. Further, the switch lever 92 includes a gear portion 94 with a plurality of teeth 95 which engage the teeth 99 of a cam member 98. As is more clearly shown in FIG. 6, the cam member 98 is rotatably mounted to be moved by the switch lever 92 on a shaft 109 suspended between the support members 111 and 112. The cam member 98 includes first, second and third cam portions 100, 101 and 102, which, as will be explained later in greater detail, serve to actuate leaf switches 114, 116, 118 and 120. A pair of projection members 104 and 105 extend from the cam member 98 with a pair of pins 106 and 107 extending therefrom to engage a frame member 122. As shown in FIG. 6, the support members 111 and 112 are secured to and extend from a mounting plate 110, and a housing member 113 is in turn secured to the support member 111. The frame member 122 includes an extended recess 123 into which the shaft 109 is inserted to allow the frame member 122 to be moved with a rectilinear motion under the influence of the cam member 98. More specifically, the pins 106 and 107 engage respectively a pair of arm portions 124 and 125 of the frame member 122.

A spring 130 is connected between the frame member 122 and a finger 131 extending from the housing member 113. The spring 130 serves to bias the frame member 122 downward to the position shown in FIG. 6. When the switch lever 92 is moved to its second position 2, the cam member 98 is rotated in a counterclockwise direction as shown in FIGS. 5 and 6 and pin 107 engages arm portion 125 to move the frame member 122 upward. In a similar manner, when the switch lever 92 is moved to its third position 3, the cam member 98 is rotated in a clockwise direction so that pin 106 engages arm portion 124 to move the frame member 122 upward. In addition, a variable resistor 128 is mounted upon the housing member 113 and includes a rotatable shaft 129 connected to a pinion gear 137. As is more clearly shown in FIG. 5, the pinion gear 127 meshes with the teeth of a rack 126 which is integrally connected to the frame member 122. Thus, as the switch lever 92 is thrown to either its second or third position, 2 or 3 respectively, the rack 126 is moved upwardly as shown in FIG. 5 to thereby rotate the shaft 129 and to change the resistance of the variable resistor 128. In addition, a snap-action switch 142 is mounted upon the housing member 113 in a position to be released by the frame member 122 as it is moved upward as shown in FIG. 5. More specifically, the frame member 122 includes a portion 143 extending from the frame member 122 and presenting a cam edge 144 which engages and releases the snap-action switch 142. As seen in FIGS. 5 and 6, the leaf switches 114, 116 and 118 are mounted upon the support member 112 to be actuated by the cam member 98 and the leaf switch 120 is mounted upon an arm extending from the housing member 113 to be actuated by the cam member 98. As shown clearly in FIGS. 5, 6 and 7, when the switch lever 92 is placed in its second position 2, cam portion 100 engages leaf switches 114 and 116 and cam portion 101 engages leaf switches 118, 120. Similarly, when the switch lever 92 is directed to its third position 3, cam portion 102 engages leaf switch 114.

Figure 7:
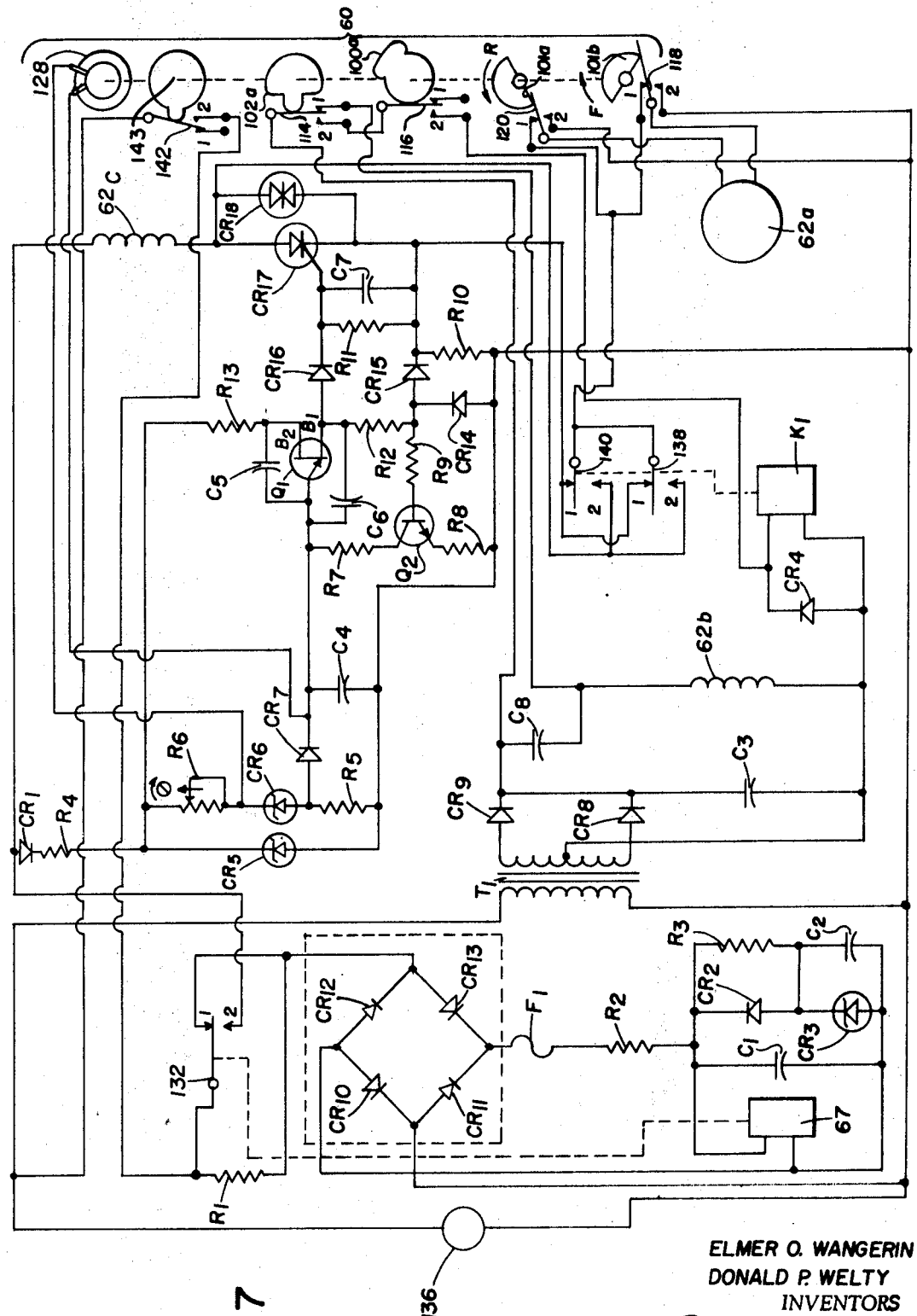
FIG. 7 is a schematic diagram of a control circuit in accordance with the teachings of this invention for regulating the speed and direction with which the motor of FIG. 4A is driven and for controlling the opening and closing of the glass of transparent flats shown in FIGS. 2 and 3.

Referring now to FIG. 7, there is shown a control circuit or circuit means for regulating the speed with and direction in which the reversible motor 62 drives the filmstrip 22 and for controlling the opening of the pressure plates 33 and 35 prior to the energization of the reversible motor 62 and the closing of the pressure plates 33 and 35 after the filmstrip 22 has been brought to a complete halt. In particular, the circuit includes an AC potential source 136, whose application to the remaining portion of the circuit is controlled by the closing of the snap-action switch 142. With reference to FIG. 5, when the switch lever 92 is moved to either its second or third position, 2 or 3 respectively, the snap-action switch 142 is closed, i.e., the switch 142 will be disposed in its second position or moved from its normal position, as shown in FIG. 7. When the switch 142 is disposed in its second position, the potential is applied through snap-action switch 132, which is normally disposed in its first position as shown in FIGS. 7 and 3, to a full-wave rectifier composed of diodes CR10, CR11, CR12 and CR13. The fully rectified or DC voltage derived from the full-wave rectifier is applied through fuse $F_1$ and limiting resistor $R_2$ across the solenoid coil 67. Upon application of potential to the solenoid coil 67, the armature 68 is pulled to the right, as shown in FIG. 3, to separate the pressure plates 33 and 35, and to throw the switch 132 from its first to its second position to thereby apply the potential from source 136 through a resistor $R_1$ to the full-wave rectifier thereby decreasing the potential applied to the solenoid coil 67. It may be understood that a greater potential is required to effect the opening of the pressure plates 33 and 35 than that required to maintain the pressure plates 33 and 35 apart.

The alternating potential applied through the snap-action switch 132 is in turn directed through a diode CR1 and a resistor $R_4$ which effects a half-wave rectification of the alternating potential. In turn, the rectified potential is applied across a Zener diode CR5 which acts as a constant potential source. The Zener diode CR5 is connected in parallel across a variable resistor $R_6$, a Zener diode CR6 and a resistor $R_3$. The Zener diode CR6 acts, as well known in the art, as a constant or reference voltage source and places a substantially constant voltage across the variable resistor 128. The variable resistor $R_6$, the Zener diode CR6, and the resistor $R_5$ act as a part of a voltage divider to determine partially the voltage developed across the resistor $R_5$. As will be explained in detail later, the variable resistor $R_6$ may be adjusted to determine the initial or slow speed of the reversible motor 62. The variable resistor 128 controls the charging rate to capacitor $C_4$; more particularly, as the resistance of the variable resistor 128 is increased, the charging rate is decreased and vice versa. As shown in FIG. 7, a clamping diode CR7 is connected between a point intermediate the capacitor $C_4$ and the variable resistor 128 and a point between the resistor $R_5$ and the Zener diode CR6. When the potential across the resistor $R_5$ becomes more positive than the potential to which the capacitor $C_4$ is charged, the diode CR7 will be forward biased to thereby clamp the potential development across the capacitor $C_4$ to that potential developed across resistor $R_5$. It may be understood that as the capacitor $C_4$ charges positively, a point will be reached at which the diode CR7 is no longer forward biased at which time the charge rate is decreased to a value determined by the resistance of variable resistor 128. As shown in FIG. 7, resistors $R_{13}$ and $R_{12}$ are connected respectively to the second and first bases of the uni-junction transistor $Q_1$ to thereby determine the potential at which the unijunction transistor $Q_1$ will be biased on. A pair of capacitors $C_5$ and $C_6$ are disposed respectively from the first base to the emitter and from the second base to the emitter of the uni-junction transistor $Q_1$ for noise suppression purposes. When the unijunction transistor $Q_1$ is biased on, the first base thereof is raised to a more positive potential to thereby forward bias a diode CR16 to fire and turn on a silicon control rectifier CR17. Resistor $R_{11}$ and capacitor $C_7$ serves as a noise suppression network for silicon control rectifier CR17.

As explained above, an alternating potential is selectively applied through a snap-action switch 132 to the speed control portion of the circuit and is further applied to a series field 62c of the reversible motor 62. Illustratively, the reversible motor 62 is known as a series field, universal motor whose speed is dependent, in part, upon the potential applied to the series field 62c. In turn, the potential applied to the series field 62c is dependent upon that portion of the cycle of the alternating potential for which a silicon control rectifier CR17 is turned "on." It is understood that the silicon control rectifier CR17 is turned "off" when the alternating potential applied thereto falls to zero and is turned "on" again during the next cycle when the alternating potential rises to a level determined by the variable resistor 128 to first turn "on" unijunction transistor $Q_1$ and then the silicon control rectifier CR17. The potential at which unijunction transistor $Q_1$ is turned "on" is controlled by the variable resistor $R_6$; this adjustment in turn controls the initial point at which the silicon control rectifier CR17 is turned "on" and therefore the initial speed at which the reversible motor 62 is run. The variable resistor 128 may be adjusted by the switch lever 92 to decrease its resistance and to thereby increase the charging current applied to capacitor $C_4$. With an increase in the charging current to capacitor $C_4$, the unijunction transistor $Q_1$ and therefore the silicon controlled rectifier CR17 are turned "on" at an earlier point in the cycle to thereby increase the potential applied to the series field 62c and an armature 62a. As a result, the speed of reversible motor 62 is increased. When the resistance of the variable resistor 128 is increased, the charging current to capacitor $C_4$ is decreased with the result that the unijunction transistor $Q_1$ and the silicon-controlled rectifier CR17 are turned on at a latter point in the cycle. As a result, a lower potential is applied to the series field coil 62c, and the armature 62a and the reversible motor 62 is run at a slower speed.

As explained above, the direction in which the reversible motor 62 is run is controlled by the switch lever 92, which may be directed from its first position 1 to its second position 2 to operate the reversible motor 62 in a reverse or rewinding direction or to its third position 3 to direct the reversible motor 62 to a forward or unwinding direction. In FIG. 7, the cam portion 101 is represented as cams 101a and 101b. When the switch lever 92 is thrown to its second position, cams 101a and 101b are rotated counterclockwise so that leaf switch 120 is disposed from its first to second position and leaf switch 118 remains in its first position. The circuit shown in FIG. 7 also includes a pair of relay switches 138 and 140 operated by a relay coil $K_1$. In the first positions, the switches 138 and 140 serve to connect the silicon controlled rectifier CR17 to leaf switches 120 and 118. With the switches 118, 120, 138 and 140 in these positions, the alternating potential derived from source 136 will be applied through the series field coil 62c, the silicon-controlled rectifier CR17, the switches 138 and 140, switch 118, across the armature 62a of the reversible motor 62 and through switch 120. The potential source 136 is applied to the armature 62a so that the reversible motor 62 will be driven in a reverse or rewind direction. It is noted that switch 138 is merely a redundant switching device in parallel with switch 140 and is operated in unison with switch 140 by the high-speed relay $K_1$. In order to operate the reversible motor 62 in a forward or advance direction, the lever switch 92 is directed to its third position 3, as shown in FIG. 5, so that the cams 101a and 101b are rotated in a clockwise direction to place switch 118 in its second position and to dispose switch 120 in its first position. As a result, the connections to the armature 62a are reversed with respect to the series field coil 62c to thereby cause the reversible motor 62 to rotate in a forward or advance direction.

When the lever switch 92 is returned to its first or neutral position 1, the switches of the switch assembly 60 will be disposed in their normal position as shown in FIG. 7. The switches 118 and 120 serve in their normal position to short out the armature 62a of the reversible motor 62 with the result that a high alternating current is generated in the armature 62a, which will oppose the direction of rotation to thereby assist in braking the reversible motor 62. As a result, the time required to halt the reversible motor 62 and the filmstrip 22 is shortened.

In order to maintain the speed of rotation of the reversible motor 62 at a predetermined, selected rate, potential applied to the armature 62a and series field coil 62c should be varied as a function of the mechanical load applied to the armature 62a of the reversible motor 62. When the reversible motor 62 is operating, a DC potential commonly known as a counterelectromotivevoltage (CEMV) is developed in the armature 62a and is used, as will be explained, to control the point at which the silicon controlled rectifier CR17 is fired. In particular, as seen in FIG. 7, the CEMV derived from the armature 62a is applied through the switches 118, 120, 138 and 140 across a resistor $R_{10}$. As can be seen in FIG. 7, a voltage divider network disposed across Zener diode CR5 is composed of resistor R13, unijunction transistor $Q_1$, resistor $R_{12}$, resistor $R_9$, the emitter base resistance of transistor $Q_2$ and resistor $R_8$. The armature 62a is connected in series through a diode CR15 to the point of connection between resistors $R_9$ and $R_{12}$. It is understood that the CEMV generated in the armature 62a is a function of the speed of rotation of the armature 62a of the reversible motor 62, i.e. the higher the speed of rotation, the greater the CEMV. As the speed of rotation increases, a more positive potential will be applied to the point of connection between resistors $R_9$ and $R_{12}$ to tend to bias transistor $Q_2$ to its conductive state. As transistor $Q_2$ is biased to its conductive state, the resistance connected in parallel with capacitor $C_4$ is decreased. As a result, the charging rate and the potential to which capacitor $C_4$ may be charged is decreased. Thus, unijunction transistor $Q_1$ will be turned "on" at a relatively later point in the cycle to thereby retard the point at which the silicon-controlled rectifier CR17 is fired. Thus, the power applied through the silicon-contrlled rectifier CR17 to the armature 62a and the speed of rotation of the armature of reversible motor 62 is reduced. Conversely, if a heavy mechanical load is applied to the armature 62a of the reversible motor 62, the armature 62a of the motor 62 will tend to be rotated at a lower speed and the CEMV will be reduced. As a result, the transistor $Q_2$ will be biased to a less conductive state and the unijunction transistor $Q_1$ will be rendered to its conductive state earlier. As a result, the silicon controlled rectifier CR17 will be fired at an earlier point in the cycle and more power will be applied across the armature 62a and series of field coil 62c, thereby increasing the speed at which the armature 62a of the reversible motor 62 is rotated.

Resistor R7, which biases the collector-base junction of transistor $Q_2$, also forms part of the motor 62 feedback loop. Zener diode CR14, which is connected across the emitter-base junction of transistor $Q_2$, serves in conjunction with Zener diode CR15 to protect transistor $Q_2$ from negative voltage levels in excess of its emitter-base limits. Thyrector CR18, which is connected across the silicon control rectifier CR17, serves to protect CR17 from overvoltage transients.

It is often desirable to rewind the filmstrip 22 onto the supply reel 56 at a relatively high speed, which need not be selectively varied. The rewinding of the reversible motor 62 at a high speed is effected by the placement of the lever switch 92 to its extreme right or second position 2, as seen in FIG. 5. With reference to FIG. 7, cam portions 100 and 102 of cam member 98 have been represented as cam portions 100a and 102a, respectively. When the switch lever 92 has been thrown to its extreme reverse position, the cam surfaces are rotated in a counterclockwise direction and switches 114 and 116 will be disposed in their second positions. As a result, the potential normally applied to the shunt field coil 62b associated with the reversible motor 62 is disconnected and the high-speed relay $K_1$ is energized to throw switches 138 and 140 from their first to second positions. As can be seen in FIG. 7, a transformer $T_1$ has a primary winding connected across the potential source 136. The secondary winding of transformer $T_1$ is rectified by a pair of diodes CR8 and CR9. Capacitor C3 serves to filter the rectified voltages outputed by diodes CR8 and CR9. When leaf switch 114 is disposed in its first position, the rectified potential is applied across the shunt field coil 62b. Capacitor C8 is connected across the contacts of switch 114 to suppress arcing resulting from its switching action. Normally, the switch 116 is disposed in its first position and no potential is applied across high-speed relay $K_1$ and the switches 138 and 140 are disposed in the first position. However, when it is desired to run the reversible motor 62 in a reverse direction at a high speed, the switch lever 92 is thrown to its remote right position as seen in FIG. 5, and switches 138, 140, 114 and 116 are disposed in their second position. Diode CR4 serves to protect the contacts of switch 116 by providing a decay current leakage path from the coil of relay K. As a result, the potential applied to shunt field coil 62b is substantially turned "off" and the potential is applied across high-speed relay $K_1$ to place switches 138 and 140 in their second position. When switches 138 and 140 are disposed in their second position, the potential developed by source 136 is no longer directed through the silicon-controlled rectifier CR17 but is applied directly to the armature 62a. As a result of these actions, the speed of the reversible motor 62 is greatly increased.

In order to stop the rotation of the reversible motor 62 and to close the pressure plates 33 and 35, the switch lever 92 is brought to its neutral or first position 1. As explained above, the armature 62a will tend to generate an opposing field to further brake the rotation of the armature 62a of the reversible motor 62. In addition, the snap-action switch 142 will be disposed in its open or first position and the potential source 136 will be disconnected from across the bridge rectifier, and therefore the power will be removed from the solenoid coil 67. However, the solenoid 64 should not at this moment release the pressure plates 33 and 35. The rectified potential derived from source 136 serves to charge a capacitor $C_2$ through resistors $R_2$ and $R_3$ and capacitor $C_1$ through resistor $R_2$. The resistance of resistors $R_2$ and $R_3$ is chosen so that capacitors $C_1$ and $C_2$ will charge at a controlled rate to allow a sufficient charge to be developed on capacitors $C_1$ and $C_2$ that will prevent the solenoid coil 67 from being deenergized until the reversible motor 62 and the filmstrip 22 have been brought to a halt. A diode CR2 is disposed in parallel across the resistor $R_3$ to prevent capacitor $C_1$ from charging capacitor $C_2$ during discharge thereof and to provide a convenient discharge path to solenoid 67 for capacitor $C_2$. A protective Zener diode CR3 is disposed in parallel across the capacitor $C_2$ to prevent an overvoltage from being placed on capacitor $C_2$. More specifically, the diode CR2 is back biased while a positive potential is applied thereto from the source 136. When the snap-action switch 142 is open or disposed in its first position, the positive potential developed by the bridge rectifier is removed from the solenoid 67 and the positive potential stored upon the capacitors $C_1$ and $C_2$ is allowed to discharge in a forward direction through the solenoid coil 67. It is particularly noted that the potential stored on the capacitors $C_1$ and $C_2$ prevents the deenergization of the solenoid coil 67 for a period of time determined by the potential to which the capacitors $C_1$ and $C_2$ were charged and sufficient to prevent the closing of the pressure plates 33 and 35 before the filmstrip 22 is brought to a complete halt. More particularly, the charge stored upon the capacitors $C_1$ and $C_2$ is a function of the length of time that the snap-action switch 142 has been closed or disposed in its second position. The longer the reversible motor 62 is allowed to operate, the longer the delay period will have to be in order to allow the filmstrip 22 to be brought to a complete halt before the closing of the pressure plates 33 and 35 assuming, of course, that switch lever 92 is not held in a fixed driving position. In this manner, the capacitors $C_1$ and $C_2$ provides a variable delay in the closing of the pressure plates 33 and 35 which is dependent upon the time period for which the reversible motor 62 is energized.

Thus, there has been shown apparatus for winding and unwinding a filmstrip between a supply reel and a takeup reel, and more particularly, a control circuit for controlling the speed with and direction in which the filmstrip is driven therebetween. The control circuit has been described as including storage means such as a capacitor for developing a signal proportional to the length of time that the filmstrip has been driven. The signal so provided is used to delay the closing of the transparent flats or pressure plates between which the filmstrip is driven for a period of time sufficient to permit the filmstrip to come to a complete halt.

The invention has been described in detail with particular reference to preferred embodiment thereof, but it will be understood that variations and modifications can be effected within the spirit and the scope of the invention.

We claim:

1. Apparatus for projecting selected images from a filmstrip and including first and second stations for storing such filmstrip, said apparatus comprising:
   a. drive means for driving a filmstrip from said first to said second storing stations,
   b. a projection station located in said apparatus between said first and second storing stations and including transparent filmstrip guide means which is movable between a first position wherein a filmstrip can be driven by said drive means past said guide means without damaging the filmstrip and a second position for supporting a filmstrip at said projection station in a position for projecting a selected image of the filmstrip, and
   c. control means operable associated with said guide means and said drive means for transposing said guide means between its first and second positions and for energizing and deenergizing said drive means, said control means including delay means for delaying transposition of said guide means from its first to its second position for a delay period dependent upon the length of time said drive means has been energized.

2. Apparatus for projecting selected images from a filmstrip directed from a first filmstrip storage station to a second filmstrip storage station, said apparatus comprising:
   a. motor means operably associated with said first and second filmstrip stations for driving the filmstrip therebetween,
   b. a projection station located in said apparatus between said first and second filmstrip storage stations and including first and second transparent plates disposed to accommodate a filmstrip therebetween, said plates being movable with respect to one another,
   c. means for moving at least one of said first and second plates connected thereto for changing the relative position of said plates from a first position wherein a selected image of the filmstrip is clamped therebetween to a second position wherein said plates are spaced apart a distance at least exceeding the minimum thickness of the filmstrip thereby facilitating movement of the filmstrip between said first and second plates, and vice versa, and
   d. control means connected to said motor means and said means for moving for controlling the operation thereof, said control means including delay means for delaying transposition of said plates from said second to said first positions for a delay period initiated by disenablement of said motor means and dependent upon the length of time said motor means has been operated, said motor means enabled by said control means only when said plates are disposed in said first position, said plates being disposed in said second position only after said delay period has expired.

3. Apparatus as claimed in claim 2, wherein said control means includes switch means having a first position for applying a source of potential to said motor means and a second position for disconnecting the potential source from said motor means, capacitive means responsive to the position of said switch means for storing an electrical signal while said switch means is disposed in its first position, and circuit means connected to said capacitive means for selectively discharging said capacitive means when said switch means is disposed in its second position.

4. Apparatus as claimed in claim 3 wherein said means for moving includes a solenoid and solenoid coil operable coupled to said first and second plates to change the relative position thereof, said solenoid coil being connected to said circuit means to that said circuits means discharges said capacitive means through said solenoid coil when said switch is disposed in its second position.

5. In apparatus for projecting selected images from a filmstrip being directed between a first filmstrip storage station and a second filmstrip storage station:
   a. reversible motor means operatively associated with said first and second filmstrip storage stations for driving the filmstrip therebetween,
   b. a projection station located in said apparatus between said first and second filmstrip storage stations and including first and second transparent plates disposed to accommodate a filmstrip therebetween, said plates being movable with respect to one another,
   c. means for moving at least one of said first and second plates connected thereto for changing the relative position of said plates from a first position wherein a selected image of the filmstrip is clamped therebetween to a second position wherein said first and second plates are separated a distance at least exceeding the minimum thickness of the filmstrip thereby facilitating movement of the filmstrip between said first and second plates, and vice versa, and d. control means connected to said motor means and said means for moving for controlling the operation thereof, said control means including first switch means disposable in a first position for applying potential signals from a source thereof to said motor means and said means for moving and in a second position for disconnecting the potential signals from said motor means and said means for moving capacitor means for storing a potential charge which is a function of the time said first switch means is disposed in said first position, and one-way conductive means cooperably connected to said means for moving for discharging said capacitive means therethrough when said first switch means is disposed in said second position to thereby cause said means for moving to dispose said plates in said first position only after said capacitive means has been discharged.

6. Apparatus as claimed in claim 5 wherein said control means includes second switch means interconnected between said first switch means and said motor means for reversing the potential signals applied to said motor means to thereby reverse the direction in which the filmstrip is driven.

7. Apparatus as claimed in claim 6 which includes low impedance means connected to said second switch means and wherein said motor means includes an armature winding, said second switch means connecting said low impedance means across said armature winding only when said first switch means is disposed in its second position.

8. Apparatus as claimed in claim 5 wherein said control means includes a silicon controlled rectifier connected to apply the potential signals to said motor means during its periods of conduction having a gate for controlling the periods of conduction of said silicon controlled rectifier and selectively variable impedance means connected to said gate for controlling the initiation point of the periods of conduction of said silicon controlled rectifier.

9. Apparatus as claimed in claim 8 wherein said motor means includes an armature winding, and said control means includes switch means and low-impedance means connected thereto, said second switch means being interconnected between said first switch means and said armature winding and responsive to the position of said first switch means for connecting said low-impedance means across said armature winding when said first switch means is disposed in said second position.

10. Apparatus as claimed in claim 9 wherein said control means includes third switch means and low impedance means connected thereto, said third switch means being interconnected between the source of potential signals, said silicon controlled rectifier and said armature winding and disposable in a first position to place said silicon-controlled rectifier in circuit between said motor means and the source of potential signals and disposable in a second position to place said low impedance means across said silicon controlled rectifier and between the source of potential signals and said armature winding to thereby increase the speed of said motor means.

11 Apparatus as claimed in claim 10 wherein said motor means includes a shunt field coil and said control means includes fourth switch means connected between the source of potential signals and said shunt field coil disposable in a first position to apply potential signals from the source to said shunt field coil and in a second position to remove the potential signals from said shunt field coil.

12. Apparatus as claimed in claim 11 wherein said control means includes a manually operable member connected to said first, second, third and fourth switch means for actuating said first, second, third and fourth switch means substantially in unison.

13. Apparatus as claimed in claim 1 wherein said drive means is energized by said control means only when said guide means is disposed in its first position, said guide means being transposed by said control means to its second position only after said delay period has expired.